United States Patent [19]
Billin et al.

[11] Patent Number: 5,111,619
[45] Date of Patent: May 12, 1992

[54] DOOR TRIM PANEL RETAINING ASSEMBLY

[75] Inventors: Martin P. Billin, Troy; Christopher G. Wedow, Mount Clemens; Dan M. Nedwick, Farmington, all of Mich.

[73] Assignee: General Motors Corporation, Detroit, Mich.

[21] Appl. No.: 744,198

[22] Filed: Aug. 12, 1991

[51] Int. Cl.$^5$ .................................................. B60J 5/04
[52] U.S. Cl. ...................................... 49/502; 296/39.1; 296/152; 24/297
[58] Field of Search ................ 49/502; 296/39.1, 152, 296/153, 906; 24/297, 289, 293, 294

[56] References Cited

U.S. PATENT DOCUMENTS

| | | | |
|---|---|---|---|
| 2,836,458 | 5/1958 | Meyer | 296/44 |
| 4,456,644 | 6/1984 | Janz et al. | 296/153 X |
| 4,469,732 | 9/1984 | Isaksen et al. | 296/39.1 X |
| 4,651,470 | 3/1987 | Imura et al. | 49/502 |
| 4,696,128 | 9/1987 | Fukuhara | 49/492 |
| 4,728,143 | 3/1988 | Tanino et al. | 296/153 |
| 4,848,829 | 7/1989 | Kidd | 296/152 |
| 4,923,542 | 5/1990 | Janicki et al. | 156/92 |
| 4,949,508 | 8/1990 | Elton | 296/39.1 X |
| 5,040,335 | 8/1991 | Grimes | 49/502 |

FOREIGN PATENT DOCUMENTS

| | | | |
|---|---|---|---|
| 2416809 | 10/1979 | France | 296/146 |
| 26631 | 2/1983 | Japan | 296/39.1 |
| 174039 | 10/1983 | Japan | 296/39.1 |
| 227811 | 10/1987 | Japan | 296/39.1 |
| 268731 | 11/1987 | Japan | 296/39.1 |

Primary Examiner—Renee S. Luebke
Assistant Examiner—Jerry Redman
Attorney, Agent, or Firm—Raymond I. Bruttomesso, Jr.

[57] ABSTRACT

An assembly for mounting a door trim panel having a mounting surface to a vehicle body door. The door trim panel has a plurality of appendages which project downward from the door trim panel and a plurality of fingers depending downward in proximity to an upper edge of the door trim panel. The door has a plurality of openings for receiving the appendages of the door trim panel adapted for securing the door trim panel to the door. The clips secured to the vehicle body door have a ramp surface for engagement by the finger of the door trim panel and adapt to slide the trim panel vertically relative to the door trim panel as the door trim panel is moved towards the body door. An engagement surface of the clip depends downward from an upper edge of the ramp surface for engaging the finger securing the trim panel to the body door.

5 Claims, 3 Drawing Sheets

DOOR TRIM PANEL RETAINING ASSEMBLY

This invention relates to an assembly for securing a door trim panel to an inner door panel and more particularly to an assembly which temporarily establishes in spaced relation the trim panel from the inner panel prior to complete installation allowing connection of the hardware and then secures the trim panel by pushing the trim panel towards the inner panel.

BACKGROUND OF THE INVENTION

It is known to construct a vehicle door with an inner panel and an outer panel that are suitably welded and flange together to define the door. A cavity defined by the inner panel and outer panel holds a window regulator and a motor for operating a power window and a solenoid for a power lock.

It is also known to have a door trim panel covering the inner panel of the door to give the vehicle a finished look. Switches and other controls for operating the motor and the solenoid are mounted to the door trim panel. Wire harnesses must be connected between the switches on the trim panel and the motor and the solenoid on the body door.

A prevailing method for connecting the hardware, such as the wire harnesses, between the trim panel and the door is for a production line worker to hold the trim panel in a spaced relation from the inner panel as the vehicle moves down the assembly line. The production line worker at the same time is required to attach the hardware between the door panel and the trim panel. Then the worker attaches the trim panel to the door panel by pushing the trim panel towards the door with fasteners on the trim panel received by aligned holes on the vehicle.

It would be desirable to have an assembly for securing the door trim panel in a temporarily spaced relation from the inner panel as the vehicle moves down the assembly line allowing the hardware to be attached prior to the door trim panel being secured to the door panel by simply pushing the trim panel against the door.

SUMMARY OF THE INVENTION

This invention provides a mounting assembly for installation of a door trim panel having a trim surface and a mounting surface upon an inner panel of a vehicle body door having a lower edge and a belt line located in proximity to a window panel. The door trim panel has a plurality of legs depending generally downward from the mounting surface near a lower edge of the trim panel, a plurality of fingers project generally in a downward direction from the mounting surface near an upper edge, and a plurality of arms projecting generally downward from a region of the mounting surface located between the legs and the fingers. The inner panel of the door has a plurality of holes near the lower edge for alignment with the legs of the trim panel and a plurality of apertures for alignment with the arms. A plurality of clips are secured to the inner panel near the belt line. Each clip has a ramp surface for engagement by the aligned finger of the door trim panel adapted for lifting the door trim panel upward relative to the body door as the door trim panel is moved towards the inner panel. An engaging surface depends from an upper edge of the ramp surface for engagement with the finger of the trim panel securing the trim panel to the body door. In operation, the trim panel is installed to the body door by the legs being inserted into the aligned holes. The trim panel is moved towards the body door causing the fingers to engage the ramp surface of the clips raising the trim panel in relation to the inner panel thereby aligning the arms with the apertures of the trim panel. When the fingers reach the upper edge of the ramp surface, the trim panel is moved downward relative to the inner panel with the fingers engaging the engaging surface of the clips and the arms being received by the apertures securing the trim panel to the body door.

One object, feature and advantage resides in the provision of an assembly for mounting a door trim panel to a vehicle body door, where the door trim panel has a plurality of appendages which project downward from the door trim panel and a plurality of fingers depending downward in proximity to an upper edge of the door trim panel and the door has a plurality of openings for receiving the appendages of the door trim panel adapted for securing the door trim panel to the door and a plurality of clips secured to the vehicle body door and each clip having a ramp surface for engagement by the finger of the door trim panel and adapted to slide the trim panel vertically relative to the door trim panel as the door trim panel is moved towards the body door and an engagement surface depending downward from the ramp surface for engaging the finger securing the trim panel to the body door.

Another object, feature and advantage resides in the provision of a clip secured to a vehicle body door adapted for securing a door trim panel where the clip is secured to the body door and has a ramp surface having an upper edge and adapted for engagement by the trim panel for moving the trim panel vertically relative to the body door as the door trim panel and the body door move toward each other horizontally and an engaging surface depending from the upper edge of the ramp surface for engaging the door trim panel in an installed position after the trim panel has moved up the ramp surface securing the door trim panel to the body door.

Further objects, features and advantages of the present invention will become more apparent to those skilled in the art as the nature of the invention is better understood from the accompanying drawings and detailed description.

DESCRIPTION OF THE PREFERRED EMBODIMENT

Figure 1:
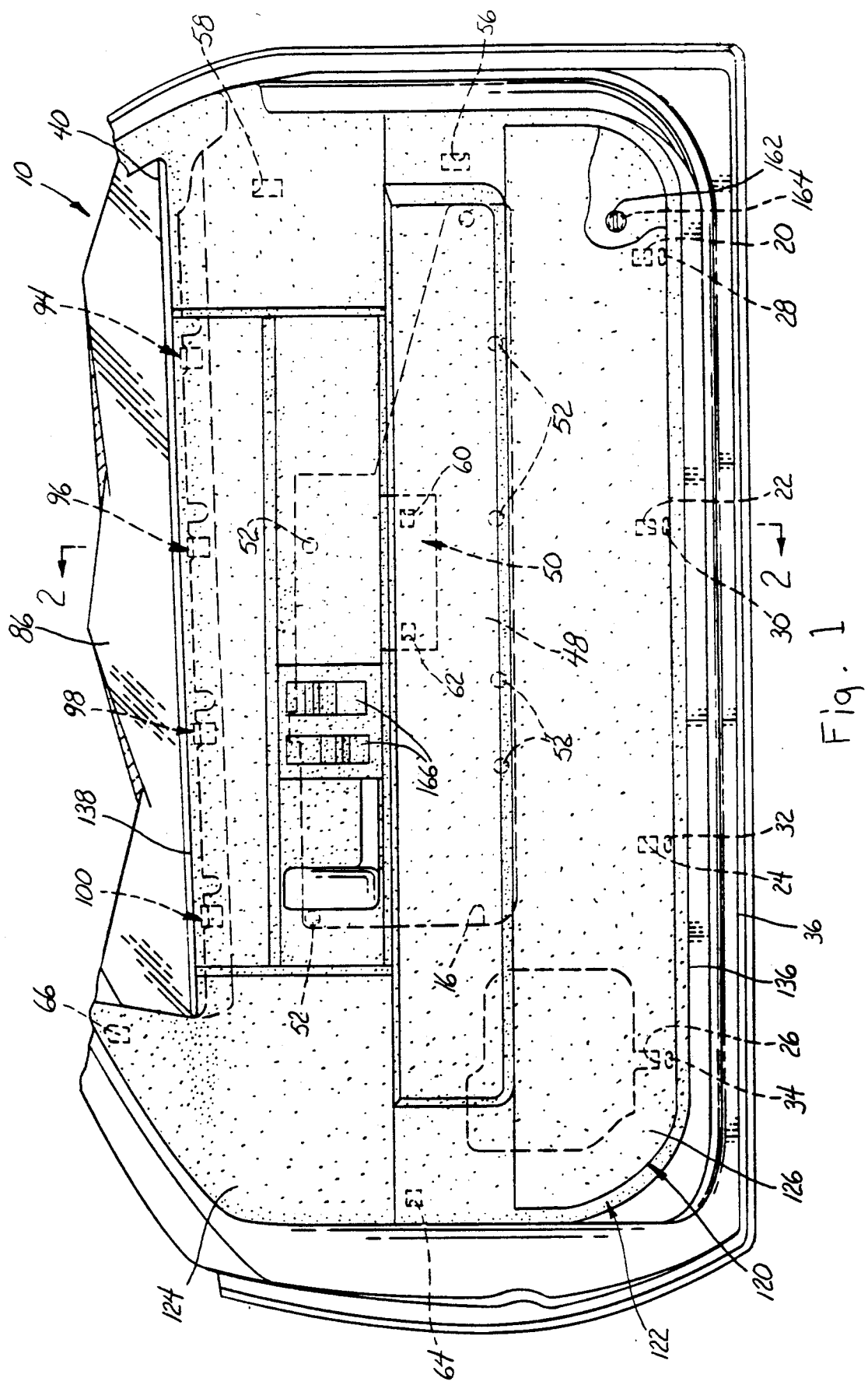
FIG. 1 is an elevation view of a vehicle body door.
Figure 2:
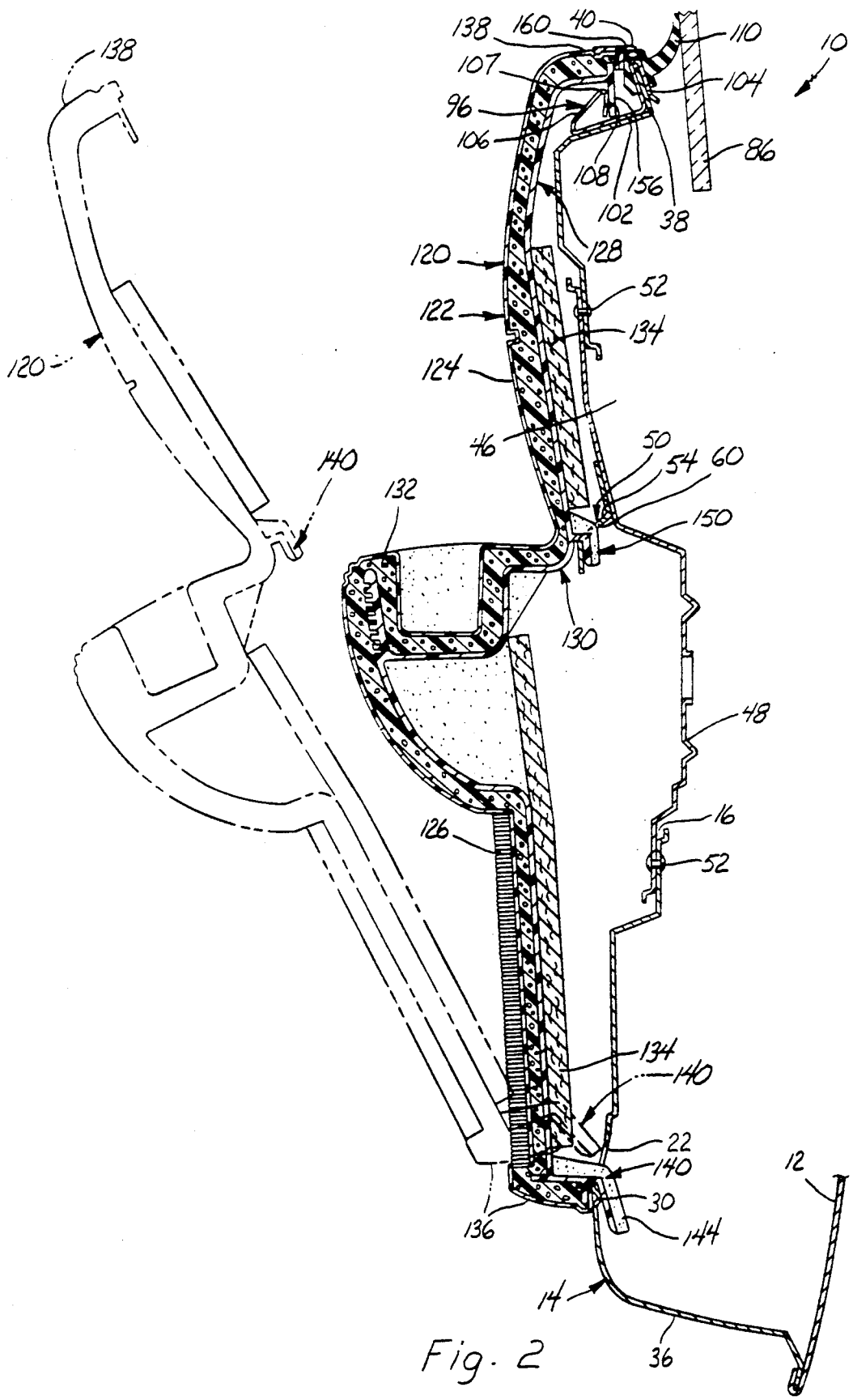
FIG. 2 is a sectional view taken in direction of arrows 2—2 in FIG. 1. The door trim panel in an assembly,, position is shown in phantom.

Referring to FIGS. 1 and 2, there is shown a vehicle body door generally indicated at 10 and comprised of a stamped sheet metal outer panel 12 and a stamped sheet metal inner panel 14. The inner panel 14 has a lower edge 36 and a flange 38. The outer panel 12 and the inner panel 14 are suitably welded and flanged together to define the door 10 and provide a cavity 46 between the inner and outer panels 14 and 12. A void 16 in the inner panel 14 grants access to the cavity 46.

A window panel 86 is mounted in the cavity 46 by use of a window regulator, not shown, which allows the raising and lowering of the window panel 86 in relation to a belt line 40, the lower edge of the window opening.

Figure 5:
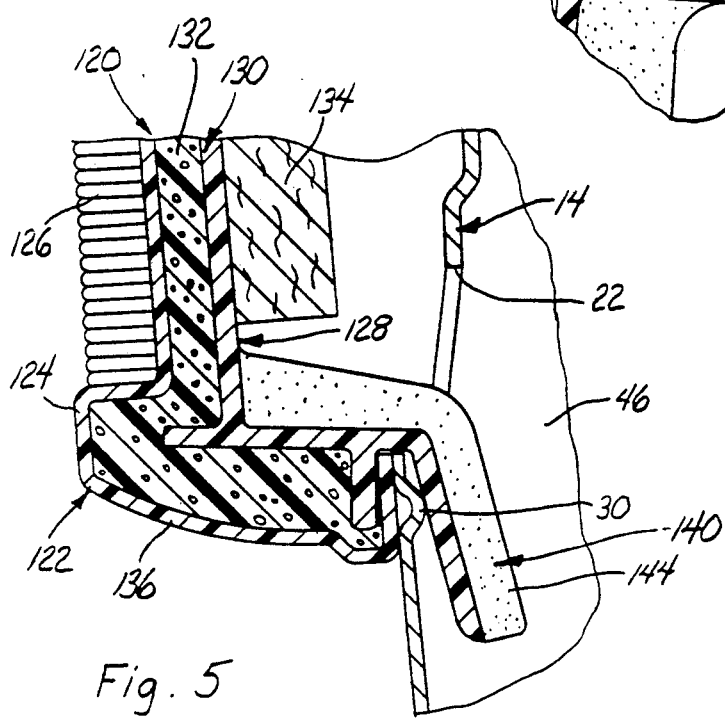
FIG. 5 is an enlarged fragmentary view of a portion of FIG. 2 showing a leg of the door trim panel received by a hole in the body door.

Referring to FIG. 1, the inner panel 14 has a series of openings shown in hidden line. The openings include a plurality of holes 20, 22, 24, and 26 near the lower edge 36 of the inner panel 14. Referring to FIG. 5, an indentation 30 projecting towards the cavity 46 is stamped in the inner panel 14 just below hole 22. Similar indentations 28, 32, and 34 are located below the holes 20, 24, and 26, as seen in FIG. 1.

The void in the inner panel 14 is partially covered by a door module 48 mounted to the inner panel 14 by a series of rivets 52. An electric motor for driving the window and a solenoid for the power locks are secured to the door module 48 by rivets, or other suitable means.

Figure 4:
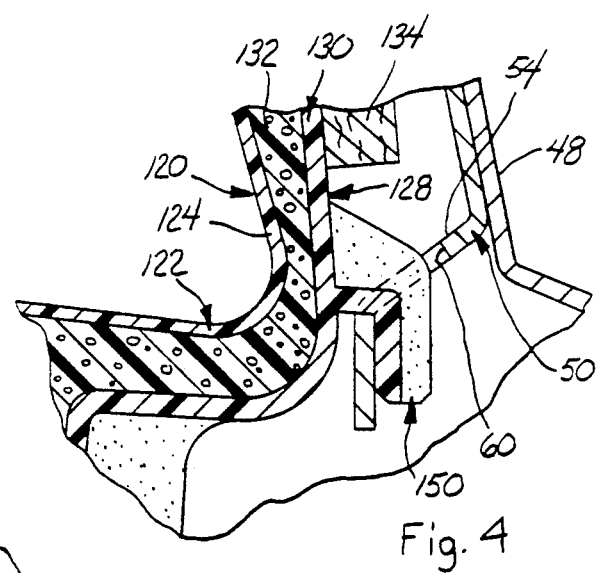
FIG. 4 is an enlarged fragmentary view of a portion of FIG. 2 showing an arm of the door trim panel received by an aperture of a door module.

Referring to FIGS. 1, 2 and 4, a bracket 50 is spot welded, or otherwise suitably attached to the door module 48. The bracket 50 projects away from the door 10 and downward creating a sloping surface 54. A pair of apertures 60 and 62 are located on the sloping surface 54 of the bracket 50.

FIG. 1 also shows a series of apertures 56, 58, and 64 are located on the middle portion of the door 10. An aperture 66 is located on the inner panel 14 above the belt line 40.

Figure 3:
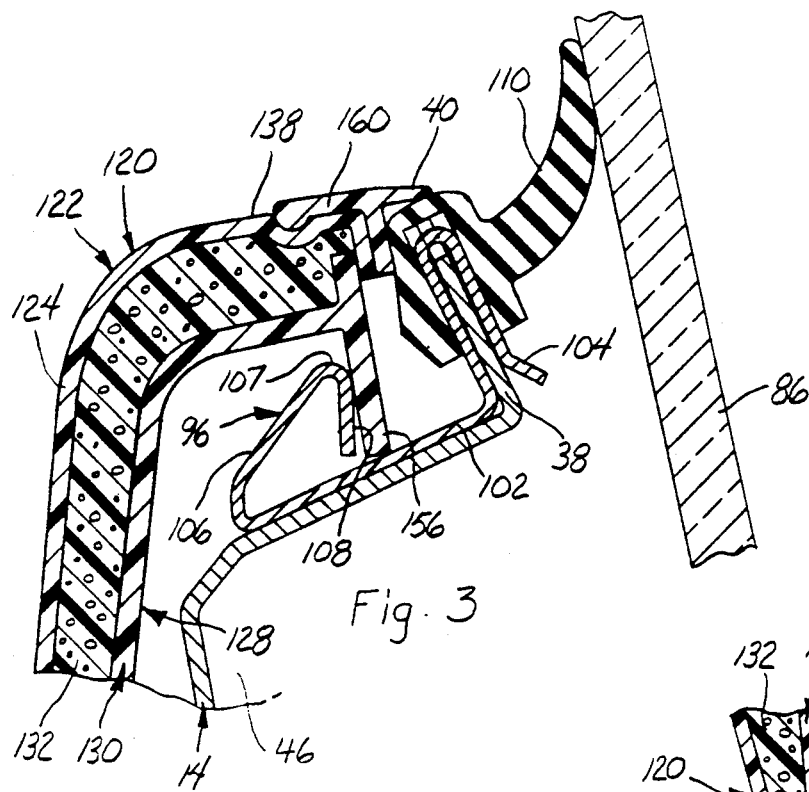
FIG. 3 is an enlarged fragmentary view of a portion of FIG. 2 showing a finger of the door trim panel engaging a clip secured to a flange of the body door near a belt line.

A plurality of clips 94, 96, 98 and 100 are spaced securely to the flange 38 of the inner panel 14. Referring to FIG. 3, a mounting portion 104 of the clip 96 secures the clip 96 to the flange 38. A base portion 102 of the clip 96 overlies and engages the inner panel 14 near the flange 38. A ramp surface 106 projects up from the base portion 102 towards the flange 38. The clip 96 terminates in an engaging surface 108 which depends from an upper edge 107 of the ramp surface 106. An inner belt seal 110 is mounted to the clip 96 and seal against the window 86 to define the belt line 40. Clips 94, 98 and 100 are similarly constructed to clip 96 with mounting portions, base portions, ramp surfaces and engaging surfaces.

A door trim panel assembly, generally indicated at 120, is provided with a trim surface 122 and a mounting surface 128. The trim surface 122 has a decorative trim portion 124 and a carpet portion 126. Referring to FIG. 2, the mounting surface 128 consists of a molded rigid panel portion 130 having a plurality of appendages 140. A urethane foam 132 is interposed between the trim surface 122 and the mounting surface 128 gives the trim panel 120 pliancy. A sound deadening material 134 is secured to the mounting surface 128 of the trim panel 120 for reducing road noise in the vehicle. The trim panel 120 has a lower edge 136 and an upper edge 138.

Referring to FIG. 5, the appendages 140, which are molded in the same process as the rest of the rigid panel portion 130, include a leg 144 which depends generally downward from the mounting surface near the lower edge 136 of the trim panel 120. The leg 144 is situated for being received by the hole 22 near the lower edge 36 of the inner panel 14 during assembly. A plurality of legs, not shown, similar to leg 144 depending generally downward from the mounting surface 128 near the lower edge 136 of the trim panel 120 and are spaced for alignment with the holes 20, 24, and 26.

Referring to FIGS. 2 and 3, the door trim panel 120 near the upper edge 138 has a finger 156 which projects generally in a downward direction from the mounting surface 128 for engaging the engaging surface 108 of the clip 96 when the trim panel is in an installed position, as shown in FIGS. 2 and 3. A molding 160 is secured to the trim surface 122 for engaging the inner belt seal 110 when the trim panel 120 is in the installed position. A plurality of fingers, not shown, similar to the finger 156 are located near the upper edge 138 of the door trim panel 120 and are spaced for alignment with the clips 94, 98 and 100 on the inner panel 14.

Referring to FIGS. 2 and 4, an arm 150 projects generally downward from a region of the mounting surface 128 between the legs and the fingers. The arm 150 is received by the aperture 60 on the bracket 50 of the door module 48. A plurality of arms similar to the arm 150 project generally downward from the region of the mounting surface between the legs and the fingers and align and register with the apertures 56, 58, 62 and 64 on the inner panel 14 and the bracket 50. An arm, not shown, is located on the trim panel 120 for alignment with the aperture 66 which is located about belt line 40 on the inner panel 14.

A screw 162, which is hidden under the rear lower corner of the carpet portion 126, is driven through a hole 164 in the trim panel 120 into the inner panel 14 to secure the panels 120 and 14 together. A set of electrical switches 166 and other accessories are located on the decorative trim portion 124.

Referring to FIG. 2, the trim panel 120 is installed to the inner panel 14 by the trim panel being canted to an assembly position as seen in phantom in FIG. 2, and the leg 144 inserted into the hole 22 of the inner panel 14. The leg 144 engages the indentation 30 holding the trim panel 120 to the inner panel 14. The other holes 20, 24, and 26 receive the other legs. The worker can rest the trim panel 120 against himself to ensure that the trim panel 120 stays in this position relative to the inner panel 14. With the trim panel 12 retained by the inner panel 14, but still spaced from the inner panel, the worker is able to connect the wire harnesses between the motor and solenoid and the switches 166. After all the connections that are required are made, the worker pushes the upper portion of the trim panel 120 towards the inner panel causing the finger 156 to engage the ramp surface 106 of the clip 96. Referring to FIGS. 2 and 3, as the trim panel 120 is pushed towards the inner panel 14, the finger 156 slides up the ramp surface 106 raising the trim panel 120 in relation to the inner panel 14. At the same time the arm 150 aligns with the aperture 60. The leg 44 moves upward relative to the hole 22, but the leg 44 does not disengage the inner panel 14. The other fingers and arms move similarly with respect to their particular clips or apertures. When the finger 156 reaches the end of the ramp surface 106, the trim panel can be pushed downward with the finger 156 engaging the engaging surface 108 placing the trim panel 120 in the installed position. The trim panel 120 is in proper position relative to the body door 10. The rear lower corner of the carpet portion 126 can be lifted up so that the screw 162 can be driven through the hole 164 in the trim panel 120 into the inner panel 14 preventing relative movement between the trim panel 120 and the inner panel 14.

While an embodiment of the present invention has been explained, various modifications within the spirit and scope of the following claims will be readily apparent to those skilled in the art.

The embodiments of the invention in which an exclusive property or privilege is claimed are defined as follows:

1. An assembly for mounting a door trim panel to a vehicle body door, the assembly comprising:

the door trim panel having a plurality of appendages which project downward from the door trim panel and at least one finger depending downward from the door trim panel;

the door having a plurality of openings for receiving the appendages of the door trim panel adapted for securing the door trim panel to the door; and at least one clip secured to the vehicle body door having a ramp surface for engagement by the finger of the door trim panel and adapted to slide the trim panel vertically relative to the body door as the door trim panel is moved towards the body door and then the clip engaging the finger securing the trim panel to the body door.

2. An assembly as in claim 1 wherein the clip has an engagement surface depending downward from the ramp surface for engaging the finger securing the trim panel to the door.

3. A clip secured to a vehicle body door adapted for securing a door trim panel, the clip comprising:

mounting means for securing the clip to the body door;

a ramp surface carried by the mounting means having an upper edge and adapted for engagement by the trim panel for moving the trim panel vertically relative to the body door as the door trim panel and the body door move toward each other horizontally; and an engaging surface depending from the upper edge of the ramp surface for engaging the door trim panel in an installed position after the trim panel has moved up the ramp surface securing the door trim panel to the body door.

4. A mounting assembly for installation of a door trim panel having a trim surface and a mounting surface upon an inner panel of a vehicle body door having a belt line in proximity to a window pane and a lower edge, the mounting assembly comprising:

the door trim panel having a plurality of legs depending generally downward from the mounting surface near a lower edge of the trim panel, a plurality of fingers project generally in a downward direction from the mounting surface near an upper edge, and, a plurality of arms projecting generally downward from a region of the mounting surface located between the legs and the fingers;

the door having a plurality of holes near the lower edge for alignment with the legs of the trim panel and a plurality of apertures for alignment with the arms; and a plurality of clips secured to the inner panel near the belt line, and each clip having a ramp surface for engagement by the aligned finger of the door trim panel adapted for lifting the door trim panel upward relative to the body door as the door trim panel is moved towards the inner panel and the ramp surface having an upper edge, and an engaging surface depending from the upper edge of the ramp surface for engagement with the finger of the trim panel securing the trim panel to the body door whereby the trim panel is installed to the body door by the legs inserted into the aligned holes and an the trim panel is moved towards the body door causing the fingers to engage the ramp surface of the clips raising the trim panel in relation to the inner panel aligning the arms with the apertures of the trim panel and when the fingers reach the upper edge of the ramp surface, the trim panel being moved downward with the fingers engaging the engaging surface of the clips and the arms being received by the apertures securing the trim panel to the body door.

5. An assembly as in claim 4 wherein the inner panel of the vehicle body door has a plurality of indentation positioned under the holes adapted to fit the legs for securing the trim panel prior to the fingers engaging the clips.

* * * * *